(No Model.)
A. B. POOL & J. J. BEALS.
AIR BRAKE MECHANISM.
No. 499,582. Patented June 13, 1893.
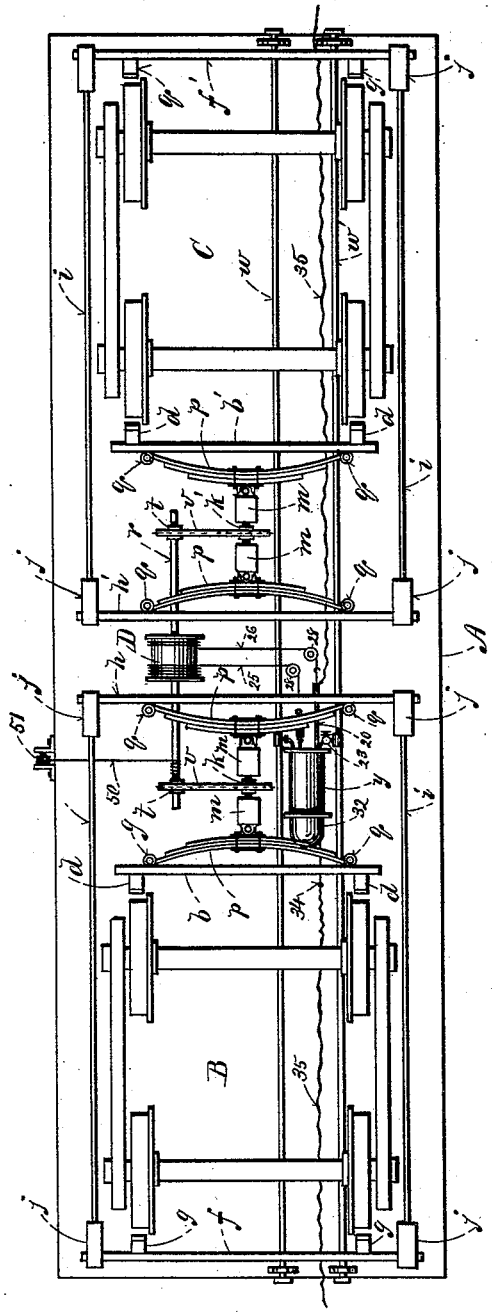
Fig. 1.
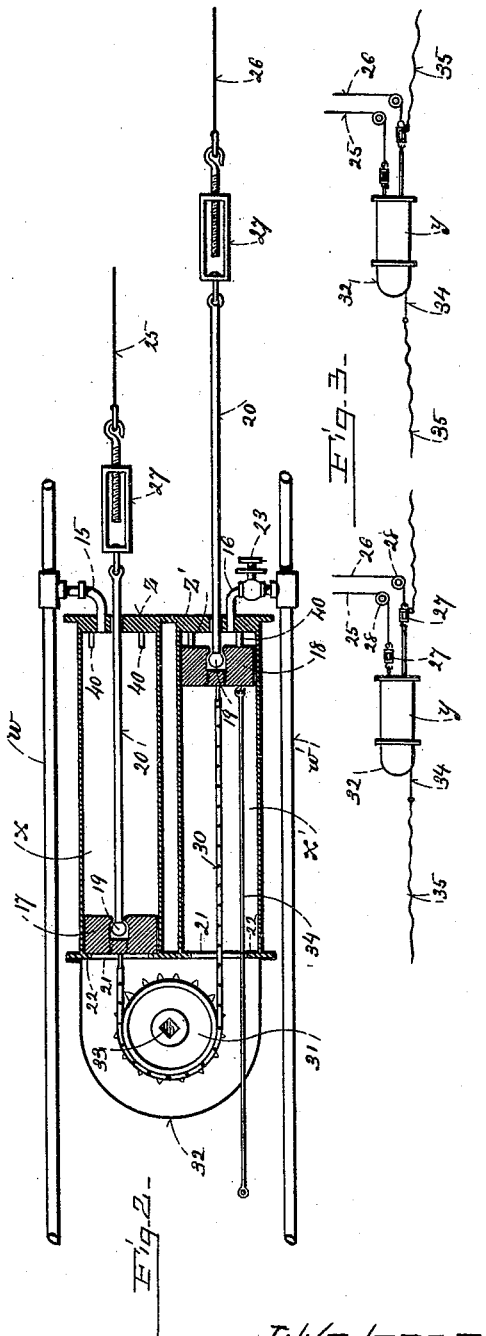
Fig. 2.
Fig. 3.
WITNESSES:
S. Durfee
Alice Scanlan
INVENTORS
Anthony B. Pool
Joseph J. Beals,
PER C. A. Shawtlee,
ATTYS.

UNITED STATES PATENT OFFICE.

ANTHONY B. POOL AND JOSEPH J. BEALS, OF BOSTON, MASSACHUSETTS.

AIR-BRAKE MECHANISM.

SPECIFICATION forming part of Letters Patent No. 499,582, dated June 13, 1893.

Application filed October 6, 1891. Serial No. 407,844. (No model.)

*To all whom it may concern:*

Be it known that we, ANTHONY B. POOL and JOSEPH J. BEALS, both of Boston, in the county of Suffolk, State of Massachusetts, have invented certain new and useful Improvements in Air-Brake Mechanism, of which the following is a description sufficiently full, clear, and exact to enable any person skilled in the art or science to which said invention appertains to make and use the same, reference being had to the accompanying drawings, forming part of this specification, in which—

Figure 1 is a bottom plan view of a car provided with our improved brake mechanism; Fig. 2 a horizontal section enlarged showing one of the twin air cylinders; and Fig. 3 a diagram illustrating the connection between the piston rods of cylinders of consecutive cars.

Like letters and figures of reference indicate corresponding parts in the different figures of the drawings.

Our invention relates especially to an air-actuated brake mechanism which is particularly adapted for use on freight-cars; and it consists in certain novel features hereinafter fully set forth and claimed, the object being to produce a simpler, cheaper and more effective device of this character than is now in ordinary use.

The nature and operation of the improvement will be readily understood by all conversant with such matters from the following explanation:

In the drawings, A represents the body of the car, and B, C, the trucks which are of the ordinary form and construction. Swinging brake-beams, $b$ $b'$, provided with shoes, $d$, are pendent from the car in position to engage the inner wheels of the trucks, B, C. In parallelism therewith and pendent from the outer ends of the car in position to engage the outer wheels of the trucks, respectively, there are elongated brake-beams, $f$ $f'$, provided with the ordinary brake-shoes, $g$.

Pendent centrally from the car there are two beams, $h$ $h'$, of the same length as the beams, $f$, $f'$, and respectively connected therewith by rods, $i$, the connections, $j$, of the rods and beams being arranged to permit vertical play.

Adjacent each beam, $b$ $b'$, and supported in suitable hangers on the car bottom there are right and left screws, $k$ $k'$, fitted to rotate. On the ends of said screw nuts, $m$, are mounted to travel. To each nut, $m$, a semi-elliptic spring, $p$, is pivoted centrally, the outer ends of said springs being provided with anti-friction rolls, $q$, which engage the adjacent beams, $b$ $h$, and, $b'$ $h'$. A horizontal rotary reversible shaft, $r$, is journaled on the car bottom in parallelism with the screw and bears a sprocket wheel, $t$, at each end, each of said sprockets being connected by a jack-chain, $v$, with a similar sprocket secured respectively on each screw, $k$ $k'$.

Centrally on the rotary reversible shaft, $r$, between adjacent beams, $h$ $h'$, there is mounted a drum, D. Two centrally arranged air-pipes, $w$, $w'$, are arranged longitudinally of the car above the trucks and between said pipes there are disposed twin cylinders, $x$ $x'$, said cylinders being inclosed in an outer casing $y$. The cylinder, $x$, is connected through its, head $z$, by a branch-pipe, 15, with the air-pipe, $w$, and the cylinder, $x'$, is connected through its head, $z'$, in like manner by a branch pipe, 16, with the air-pipe, $w'$. Air-tight pistons, 17, and, 18, are respectively fitted to slide in the cylinders, $x$, $x'$, and connected with each of said pistons by a ball and socket-joint, 19, there is a piston-rod, 20, which plays through the respective heads, $z$ $z'$. The opposite ends of the cylinders are open at, 21, an inwardly projecting lip or flange, 22, preventing the piston from leaving said cylinders at that end. A valve, 23, is interposed in the branch pipe, 16, to regulate the amount of air admitted to the cylinder, $x'$, from the pipe, $w'$. Cords, 25, and, 26, are attached by suitable take-up connections, 27, with the piston rods, 20. Said cords respectively pass over pulleys, 28, on the car-bottom and are wound in opposite directions on the drum, D. The pistons, 17, and, 18, are connected by a jack-chain, 30, which passes through the cylinder opening, 21, and around a pulley preferably a sprocket pulley 31, journaled to rotate horizontally from the car bottom. Said wheel, 31, is surrounded by a casing, 32, to prevent grit entering the cylinders through the openings, 21. The journal on the sprocket-pulley is squared at, 33, and may project through the bottom of the car to receive a key whereby the sprocket may be rotated by hand.

The piston, 18, has a rod, 34, attached to it said rod passing through the opening, 21, and casing, 32. A cord, 35, connects the rod, 34, with the piston-rod, 20, of a preceding car in the train, the cylinders of all the cars of said train being thus continuously connected for the purpose hereinafter described.

The air conducting pipes, $w$, $w'$, are connected between the cars and with the engine by the usual flexible connection pipe employed in air-brake systems.

In the use of our improvement, the air being forced from the engine into the pipe, $w'$, passes through the branch-pipe, 16, into the cylinder, $x'$. The piston, 18, is driven inward, thereby drawing the cord, 26, attached to its piston-rod, 20, inward over the pulley, 28, and rotating the drum, D. The rotary reversible shaft, $r$, to which said drum is secured is thereby rotated conjointly driving the screws, $k\ k'$. The nuts, $m$, on said screws are caused to travel outward forcing the springs, $p$, against adjacent brake-beams, $b$, $h$, and, $b'$, $h'$, and driving, the shoes, $d$, $g$, conjointly against all the wheels of the truck.

The screw-actuated brake-mechanism herein described is the same as that shown and claimed in our application for Letters Patent of the United States for improvement in car-brakes filed April 28, 1891, Serial No. 390,793.

As the drum, D, is rotated by the unwinding of the cord, 26, therefrom, the cord, 25, is wound on said drum drawing the piston, 17, outward, the chain, 30, connecting said pistons working freely over the sprocket-pulley, 33, and rendering the movement thereof positive. Stops, 40, projecting from the inner faces of the heads, $z$, $z'$ limit the movement of the pistons toward said heads and afford space for the expansion of the air when admitted from the branch pipes. By shutting off the air from the pipe, $w'$, and admitting it to the pipe, $w$, the piston, 17, is forced inward into the position shown in Fig. 2, rotating the drum in the opposite direction and actuating the screws, $k, k'$, correspondingly causing the nuts to move inward thereon and disengaging the brake-shoes from the wheel. A cord, 50, is wound on the rotary reversible shaft, $r$, and passes over a pulley, 51, on the side of the car, thence upward to the top thereof where it is connected with any suitable signal which may be projected from the car body so as to be in view of the engineer as said shaft is rotated to set the brakes. By means of said signal, should any accident occur to the cylinders, the engineer can at once determine on which car the brakes remain set.

In case of the pistons failing to act, as described, by means of the key the sprocket-pulley, 31, can be rotated to draw the piston, 17, outward into the position shown in Fig. 2, rotating the drum, D, to free the brakes.

Should the cars of the train accidentally become disconnected or "part," presuming the train to be moving, from right to left as viewed in the drawings, the cord, 35, connecting the piston, 18, of one cylinder with the piston-rod, 20, of the corresponding piston in the like cylinder on a preceding car of the train would draw said piston, 18, inward, immediately setting the brakes on all that portion of the train at the rear of such break. This prevents the detached portion of the train from colliding with the remaining portion when the engine is slowed on account of such accident.

It will be seen that by arranging the parts as described the direct positive action of the air is obtained on the brakes, the springs, $p$, relieving the contact with the wheels sufficiently to prevent all jarring or jumping resultant from braking all the wheels of the train simultaneously.

Having thus explained our invention, what we claim is—

1. In a car brake, the combination of a brake beam, a screw connected to said brake beam, a rotary reversible shaft, means for connecting said shaft with said screw, a drum on said shaft, two cords or chains, one wound in one direction and the other in the reverse direction on said drum, two cylinders having their pistons respectively connected with said chains; and pipes for connecting said cylinders with a steam or compressed air source, substantially as described.

2. In a car brake, the combination of twin cylinders, brake pistons and rods moving in said cylinders in opposite directions, a sprocket wheel, and a chain connecting said pistons together and passing over said sprocket wheel, substantially as described.

3. The combination of a car, a cylinder thereon provided with a piston having its rod connected to a car brake mechanism, and a cord or similar device for connecting said rod with the corresponding piston on a succeeding car, substantially as described.

4. In a car brake, the combination of a brake mechanism, an actuating shaft therefor, a drum on said shaft, twin cylinders, rods moving in opposite directions in said cylinders, cords connecting said drum and rods, said rods being provided with piston heads connected therewith by a ball and socket joint, a chain connecting said piston heads together, and a sprocket wheel over which said cord or chain plays.

5. In a car brake, the combination of a brake mechanism, a rotary reversible shaft, a drum on said shaft, twin cylinders, provided with pistons, cords connecting said pistons and drum, a signal device, and a cord or chain connecting said device with said rotary reversible shaft.

6. In a car brake, the combination of twin cylinders on the car provided with openings at one end, pistons moving in opposite directions in said cylinders, a sprocket wheel in said casing, a chain connected to the pistons and passing over said sprocket wheel, a rotary reversible shaft, a drum on said shaft, cords connecting said drum and pistons, and a brake mechanism operatively connected to said shaft.

ANTHONY B. POOL.
JOSEPH J. BEALS.

Witnesses:
O. M. SHAW,
K. DURFEE.